(12) United States Patent
Spasojevic

(10) Patent No.: US 6,269,410 B1
(45) Date of Patent: Jul. 31, 2001

(54) METHOD AND APPARATUS FOR USING SYSTEM TRACES TO CHARACTERIZE WORKLOADS IN A DATA STORAGE SYSTEM

(75) Inventor: Mirjana Spasojevic, Palo Alto, CA (US)

(73) Assignee: Hewlett-Packard Co, Palo Alto, CA (US)

( * ) Notice: Subject to any disclaimer, the term of this patent is extended or adjusted under 35 U.S.C. 154(b) by 0 days.

(21) Appl. No.: 09/249,399

(22) Filed: Feb. 12, 1999

(51) Int. Cl.[7] .................................................. G06F 13/10
(52) U.S. Cl. .................................................. 710/5; 709/105
(58) Field of Search .................................. 709/102–107; 710/15–19; 711/114; 714/47

(56) References Cited

U.S. PATENT DOCUMENTS

| | | | |
|---|---|---|---|
| 4,852,001 | * | 7/1989 | Tsushima et al. ........................ 705/8 |
| 5,036,456 | * | 7/1991 | Koegel ................................... 710/17 |
| 5,978,844 | * | 11/1999 | Tsuchiya et al. ..................... 709/221 |
| 6,006,248 | * | 12/1999 | Nagae .................................. 709/105 |
| 6,047,309 | * | 4/2000 | Dan et al. ............................ 709/201 |
| 6,061,761 | * | 5/2000 | Bachmat .............................. 711/114 |
| 6,076,174 | * | 6/2000 | Freund ................................. 714/47 |
| 6,078,943 | * | 6/2000 | Yu ........................................ 709/105 |
| 6,112,257 | * | 8/2000 | Mason, Jr. et al. .................... 710/18 |
| 6,119,174 | * | 9/2000 | Borowsky et al. .................... 710/15 |
| 6,148,324 | * | 11/2000 | Ransom et al. ...................... 709/105 |
| 6,154,852 | * | 11/2000 | Amundson et al. .................... 714/5 |
| 6,173,306 | * | 1/2001 | Raz et al. ............................ 709/102 |

* cited by examiner

Primary Examiner—Christopher B. Shin

(57) ABSTRACT

I/O activity of a data storage system is characterized by collecting system traces generated during the I/O activity, grouping records in the system traces according to stores, identifying I/O activity in streams corresponding to the stores, and processing the groups of records to characterize I/O activity for the streams. The stores represent units of storage such as logical drives, single data storage devices and groups of data storage devices in the data storage system. Characterizations of the I/O activity may be used to re-allocate data across the data storage system.

25 Claims, 7 Drawing Sheets

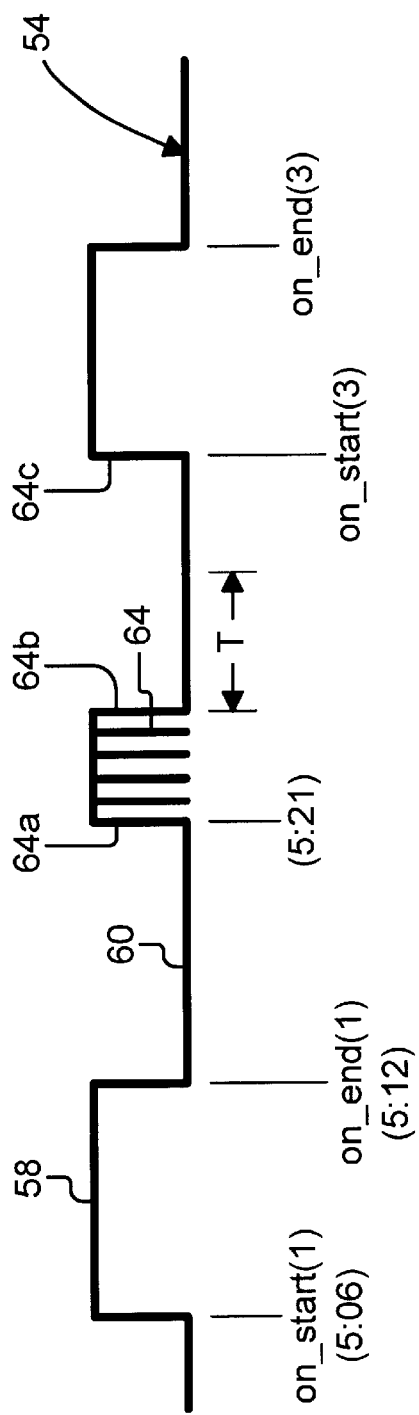
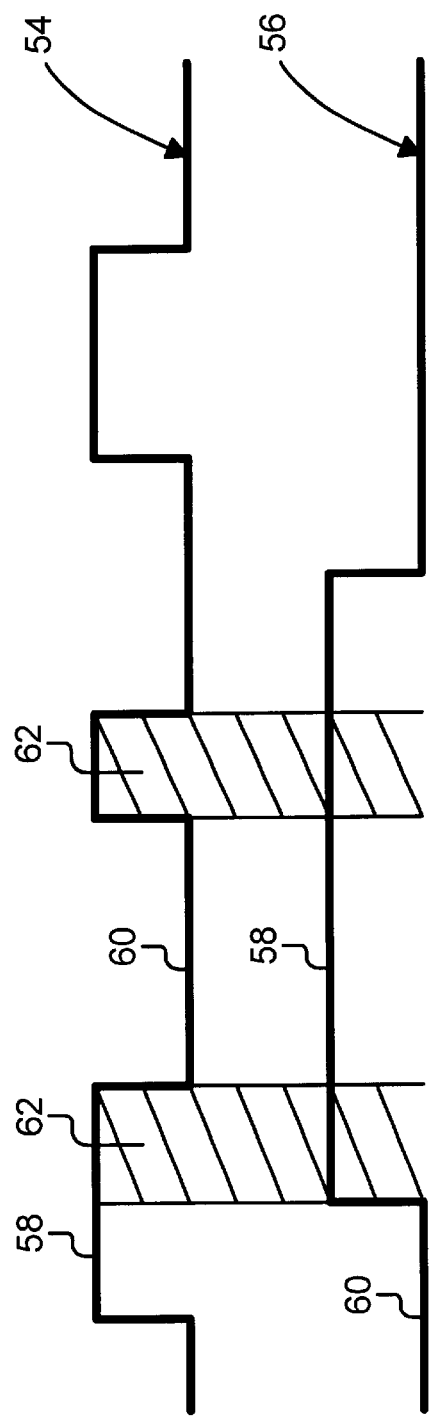

METHOD AND APPARATUS FOR USING SYSTEM TRACES TO CHARACTERIZE WORKLOADS IN A DATA STORAGE SYSTEM

BACKGROUND OF THE INVENTION

The present invention relates to data storage systems. More specifically, the present invention relates to methods and apparatus for distributing data over a range of data storage devices.

Configuration and management of a data storage system can be a major undertaking. Planning for a medium-scale installation (e.g., a few terabytes) might take many months, representing a significant fiscal expenditure. High-end applications (e.g. OLTP or decision support systems) typically deal with many terabytes of data spread over a range of physical devices. The difficulties inherent in configuring and managing storage are compounded by the sheer scale of the systems. Additionally, these high-end applications tend to exhibit fairly complex behaviors. Thus, the question of how to distribute data over a range of storage devices while providing some performance guarantees is not trivial.

The configuration and management difficulties are further compounded because the configuration of a data storage system is dynamic. After a system is initially configured, the configuration is likely to change. Applications and databases are added, new devices are added, older devices that become obsolete and defective devices are removed and replaced by devices having different characteristics, etc. Adding to the complexity of configuring a system is the use of network-attached storage devices along with client's desire to share the storage across multiple computer systems with nearly arbitrary interconnection topologies via storage fabrics like fiber-channel networks.

The complexity of configuration and management can lead to poor provisioning of the resources ("capacity planning"). Poor capacity planning, in turn, might result in the use of more data storage devices than needed. This, in turn, can needlessly add to the cost of the data storage system.

Additional problems can flow from poor capacity planning. Poor allocation of data among different devices can reduce throughput. For example, two data sets (i.e., two database tables) that are stored on the same device might be accessed at the same time. Those two data sets could compete for the same throughput resources and potentially cause a bottleneck and queuing delays.

Queuing delays arise when a storage device is in the process of servicing a first request and receives additional requests. The additional requests are usually queued and will not be serviced until an outstanding request is completed by the device. Eventually, the storage device will service all of the requests that are queued; however, response time will suffer.

Analysis of application behavior such as "workload characterization" can be used to improve the capacity planning of data storage systems. For example, if two data sets are competing for the same throughput resources, it would be very useful to identify the degree to which these data sets are being used simultaneously. Once identified, the data sets can be re-allocated to avoid a bottleneck.

Therefore, it would be desirable to have a better understanding of workload characterization in order to better allocate workloads across the storage devices.

SUMMARY OF THE INVENTION

The present invention allows for an understanding of I/O activity patterns which, in turn, allows for a better allocation of data across multiple storage devices in a data storage system. I/O activity is characterized in terms of streams (I/O request collections) accessing stores (units of storage).

According to one aspect of the invention, use is made of system traces that are generated during I/O operations with the data storage system. The system traces are gathered, records in the gathered system traces are grouped according to stores, I/O activity in streams corresponding to the stores is identified, and groups of records are processed to characterize I/O activity patterns corresponding to the streams.

The stores can be re-allocated across the data storage system based on this characterization of the I/O activity patterns. Thus, the present invention can be used to increase data throughput of the data storage system, decrease data storage capacity, and reduce response time.

Other aspects and advantages of the present invention will become apparent from the following detailed description, taken in conjunction with the accompanying drawings, illustrating by way of example the principles of the present invention.

BRIEF DESCRIPTION OF THE DRAWINGS

FIG. 5 is an illustration of an I/O activity in a stream corresponding to a store in the data storage system;

FIG. 7 is an illustration of I/O activity overlap between two streams;

DETAILED DESCRIPTION OF THE INVENTION

Figure 1:
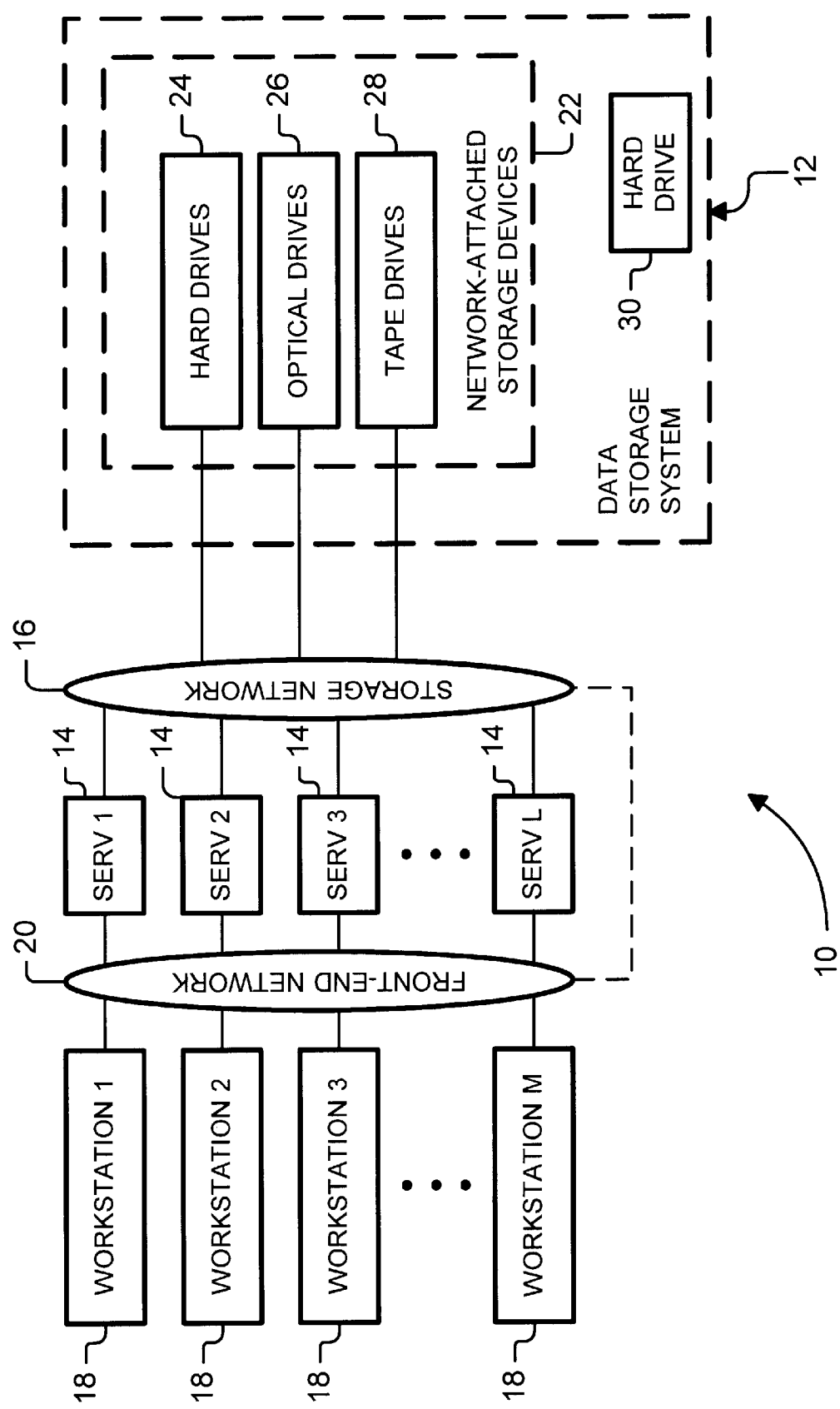
FIG. 1 a block diagram of an enterprise system according to the present invention.

As shown in the drawings for purposes of illustration, the invention is embodied in an enterprise system including a data storage system and a machine that makes use of system traces to characterize I/O activity of different streams in the data storage system. The data storage system includes a range of data storage devices. Among the characterizations generated from the system traces is an overlap in I/O activity across different streams. The I/O activity characterizations may be used to allocate data more efficiently across the data storage system. Additionally, the machine handles large volumes of system traces in a computationally efficient manner.

FIG. 1 shows an enterprise system 10 including a data storage system 12 and one or more servers 14 that communicate with the data storage system 12 via a network 16 such as a fiber-channel network. The servers 14 communicate with a plurality of workstations 18 via a front-end network 20. Alternatively, the workstations 18 may bypass the servers 14 and communicate directly with the storage network 16, as shown by the dashed line.

The data storage system 12 may include a plurality of network-attached storage devices ("NASD") 22 connected to the storage network 16. The NASD 22 might include any number and types of drives, such as hard drives 24, optical drives 26, and tape drives 28. The data storage system 12 is not limited to the NASD 22.

Each server 14 is capable of running one or more applications. Exemplary applications include, but are not limited to, database programs, e-mail programs, and backup programs. Certain applications data might be resident in the servers, and other application data (e.g., databases, backup files) might be stored across the data storage devices 24, 26, 28 in the data storage system 12.

Users of the enterprise system 10 communicate with the application servers 14 through the workstations 18. When a workstation 18 performs an operation, it might send a request to a server 14 to retrieve information stored in the data storage system 12. Upon receiving the request, the server 14 determines the location of the requested information and then retrieves the information from one or more of the devices 24, 26, 28 in the data storage system 12. The server 14 then sends the requested information to the workstation 18 making the request.

Typically, more than one workstation 18 will be executing applications at a given time. Typically, more than one server 14 will be accessing and storing application data in the data storage system 12. A store will hereinafter refer to a unit of data storage. For example, a store might be a logical unit of data, such as a file, a database table or a portion thereof. The store might reside on a single device; or it might be striped over a whole range of devices.

Data flowing between a server 14 and a store will hereinafter be referred to as a "stream." A stream is a collection of I/O requests for data housed by a particular store.

Multiple streams might access the same store at a given time. The total collection of streams corresponding to a store will be referred to as the "workload" corresponding to the store. Thus, a workload constitutes the sum of I/O activity for a store at a given time.

Figure 2:
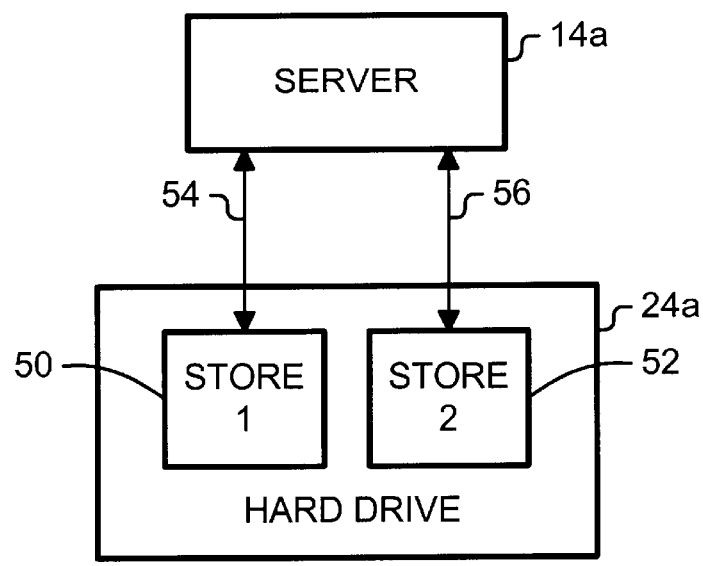
FIG. 2 is an illustration of I/O operations between a server and a data storage device of the system shown in FIG. 1.

Reference is now made to FIG. 2, which illustrates the flow of data between a server 14a and two stores 50 and 52. By way of example, the first store 50 is a first database, and the second store 52 is a second database, both of which reside on the same hard drive 24a of the data storage system 12. A first workstation (not shown in FIG. 2) might access the first database 50 at the same time a second workstation (not shown in FIG. 2) accesses the second database 52.

Running on each server 14 is a "UNIX" kernel, which performs a sensor-like function, measuring the flow of data between the server 14a and the hard drive 24a. A trace facility also running on the server 14a gathers system traces indicating measurements of the data flow.

A first stream 54 represents the flow of data between the server 14a and the first store 50, and a second stream 56 represents the flow of data between the server 14a and the second store 52. For each additional store, there would be a stream representing the flow of data between that additional store and the server 14a. Multiple streams may flow between the server 14a and hard drive 24a concurrently.

The data does not actually flow between the server 14a and the hard drive 24a in separate streams. However, the concept of separate "streams" will be useful during post-processing to determine attributes of the stores and their corresponding streams.

Returning to FIG. 1, each server 14 has an operating system and a server program that runs on top of the operating system. An operating system such as "HP-UNIX" includes an "HP-UNIX" kernel. The "HP-UNIX" kernel performs a sensor-like function, measuring the flow of data between the server 18 and a data storage device 24, 26, 28. The "HP-UNIX" kernel generates disk I/O traces (i.e., system traces) that indicate measurements of the data flow. Other variations of UNIX include kernels that generate system traces or equivalents thereof. Operating systems other than "UNIX" are also known to generate system traces or equivalents thereof. Therefore, the invention is not limited to an "HP-UNIX" operating system.

While the applications are running, the disk I/O traces are gathered by a kernel-level trace facility that is built into each operating system. Each trace facility instructs each sever 14 to gather and store the system traces. Therefore, one or more servers 14 might be gathering I/O traces.

Gathering traces in a high-end enterprise application may frequently result in a trace that is significant in size (a few gigabytes or more). Therefore, the system traces are stored on a separate data storage device 30 that does not house any of the application data. The system traces are stored on the separate data storage device 30 so as not to affect system behavior.

How a server 14 is commanded to gather system traces will depend upon the operating system. On a server 14 having an "HP-UNIX" operating system, a system administrator can initialize trace gathering by invoking a "Kltrace" binary and pointing to a location for storing the traces (e.g., the separate data storage device 30). Although "Kitracing" is specific to "HP-UNIX" other operating systems can perform equivalent functions.

Figure 3:
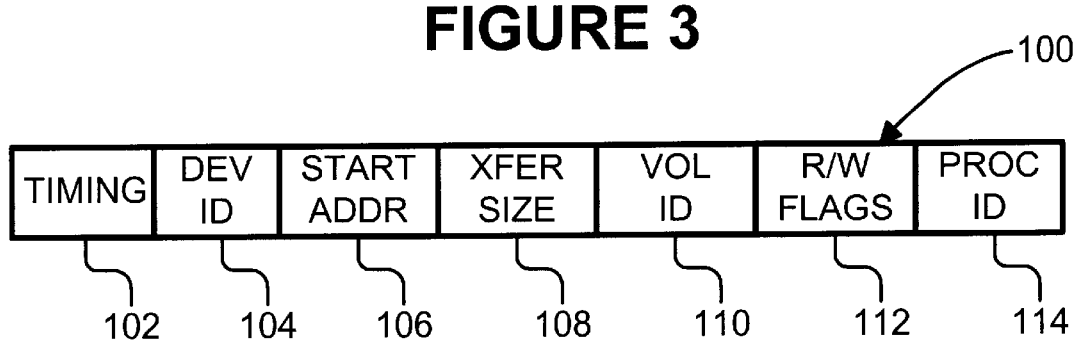
FIG. 3 is an illustration of records in a system trace.

FIG. 3 shows a system trace 100 in greater detail. Each trace 100 includes a collection of records 102 to 114 providing detailed information about an I/O request. The records 102 to 114 include:

1) timings (102) of enqueue time (when the kernel first sees the request), start time (when the request is sent to the disk and completion time (when the request returns from the disk);
2) physical device id number (104);
3) start address (106);
4) transfer size (108);
5) logical volume id number (110);
6) read/write flags (112); and
7) process id number (114).

After the system traces have been gathered, the server 14 or another computer (perhaps a workstation 18) can perform post-processing of the traces stored on the separate data storage device 30. During post-processing, records in the system traces are grouped according to stores, I/O activity in streams is identified and groups of records are processed to generate attributes that characterize I/O activity of the different streams. Based on these I/O activity characterizations, data can later be re-allocated across the data storage system 12.

The attributes generated for each stream may include, without limitation, the following:

1) requestSize (statistics regarding size of the requested data);
2) requestRate (statistics regarding request rate during bursty I/O periods);
3) runCount, (statistics regarding a degree of sequential access);
4) onTime and offTime (statistics regarding phasing or "burstiness" of I/O activity); and 5) overlapFraction (statistics regarding the likelihood of two workloads being on at the same time).

Characterizing the I/O activity in this way can significantly improve the worst-case analysis of the performance of the data storage system 12. The requestRate, requestSize and runCount attributes may be used to characterize needed throughput in the data storage system 12. In addition, the overlap Fraction attribute might be used to determine better Quality of Service ("QoS") guarantees regarding response time, than what is feasible based just on requestRate, requestSize and runCount attributes.

Figure 4:
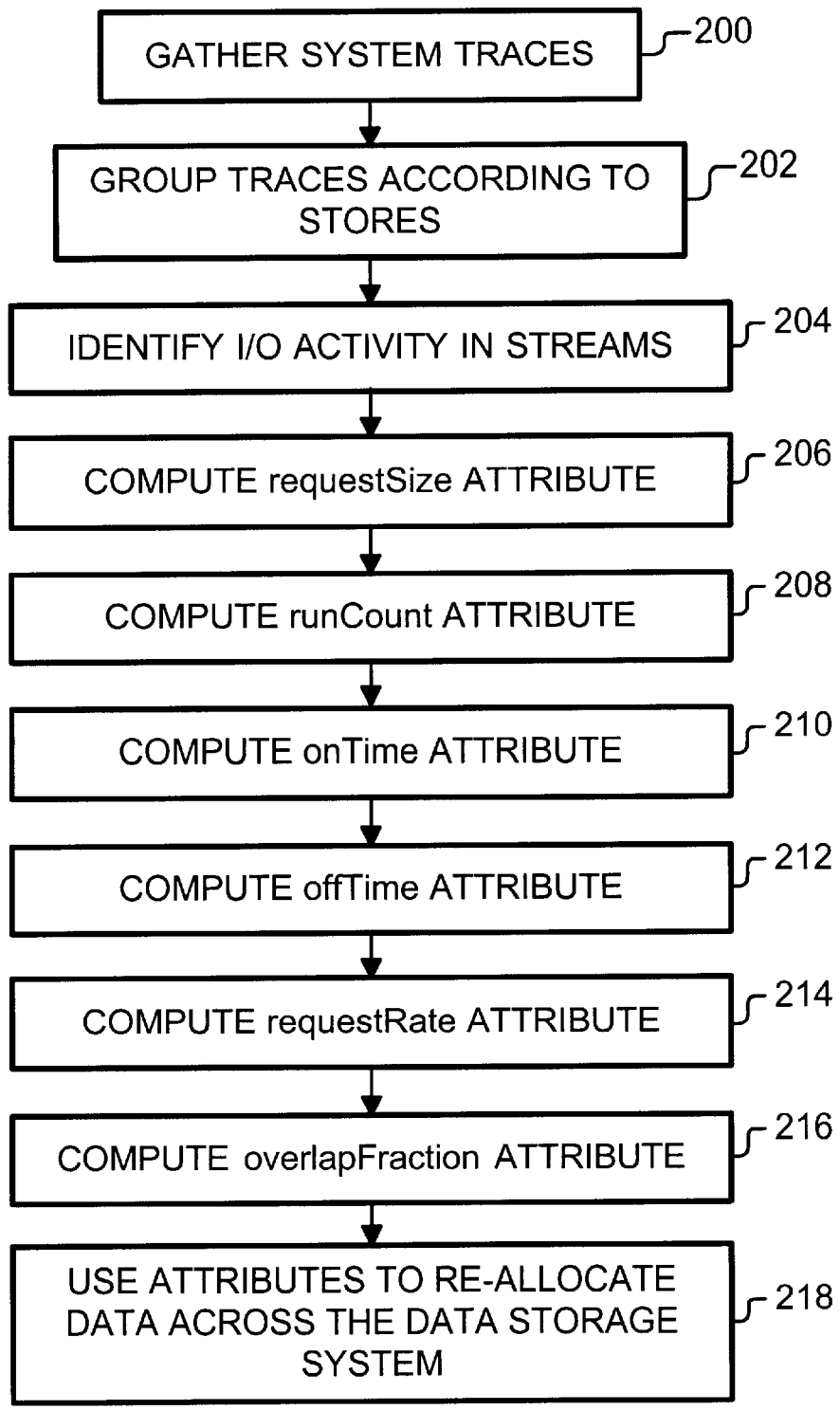
FIG. 4 is a flowchart of a method for characterizing access patterns of the I/O activity based on collected system traces, the method being performed in accordance with the present invention.

FIG. 4 shows a method of gathering, grouping, identifying and processing the system traces. While applications are running, one or more trace facilities gather the system traces (block 200) and store the system traces on the separate data storage device 30.

After the system traces have been gathered and stored on the separate storage device 30, off-line processing begins. The off-line processing can be performed by a host (e.g., server 14, workstation 18) that can access the system traces stored on the separate storage device 30.

Records in the gathered traces are grouped according to stores (block 202). Grouping is performed by examining the records. One of the records in each system trace will indicate the corresponding store. For example, the record physical device id number or process id number might provide the indication.

Figure 6:
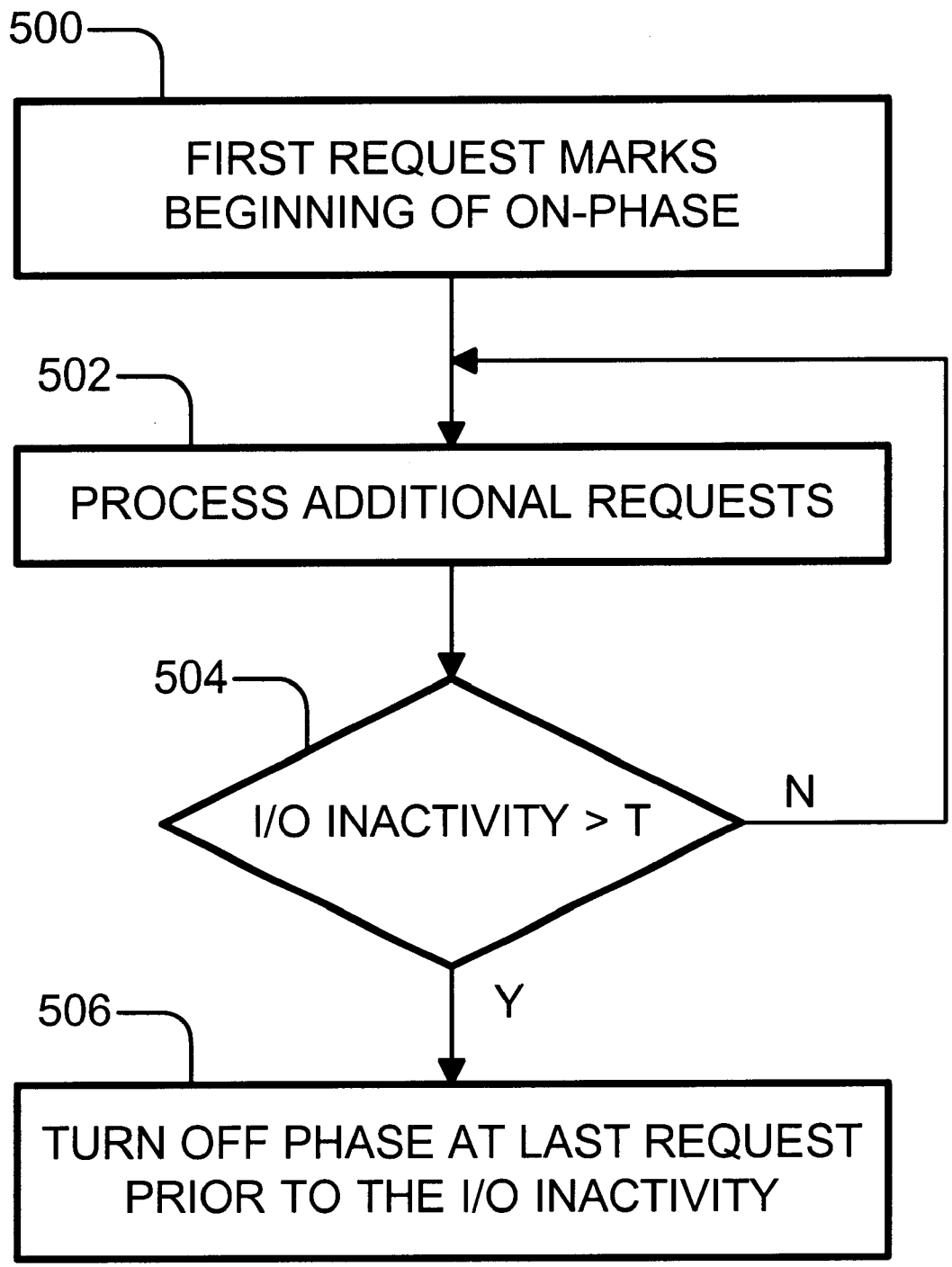
FIG. 6 is a flowchart of a method of identifying periods of burstiness of I/O activity in a stream.

Reference is now made to FIGS. 5 and 6. I/O activity in streams corresponding to the stores is identified (block 204). A graphical representation of a stream 54 is shown in FIG. 5. For exemplary purposes only, the first stream 54 representing the flow of data between the server 14a and the first store 50 (see FIG. 2) is shown.

I/O activity in the first stream 54 is characterized by "ON" phases (such as phase 58) and "OFF" phases (such as phase 60). Periods of significant I/O activity correspond to the ON phases and periods of no I/O activity correspond to the OFF phases.

The first stream 54 is characterized as follows from the system trace records corresponding to the first store 50. A first trace record 64a following a period of no I/O activity marks the beginning of an ON phase of the stream 54 (block 500). The start time in the timestamp of the first trace record 64a indicates the starting time of the ON phase.

Timestamps of additional traces records 64 for the stream 54 are examined (block 502). As soon as an arbitrary period T (for example, two seconds) elapses without a system trace being generated (i.e., no I/O activity for a period T) for the first stream 54 (block 504), the end of the ON phase is established at the last request 64b prior to the period T of I/O inactivity (block 506). Thus, the ON phase 64 is between the timestamps of the first and last trace records 64a and 64b. After the last record 64b, the end of phase is established. The beginning of the new phase is established when a next trace record 64c occurs.

Returning now to FIG. 4, various attributes characterizing I/O activity for each stream corresponding to a store are generated (blocks 206 to 216). The attributes for streams may be statistics of I/O activity distribution. The statistics might include means and variance, histograms or other statistical measurements.

The requestsize attribute for each store and stream may be computed as the mean and variance of size for all observed requests (block 206). The runCount attribute for each store and stream may be computed as the mean and variance of the number of consecutive requests in the trace that read data in a sequential manner (block 208). Whether data is accessed sequentially is indicated by examining the records for start address and transfer size.

Workload phasing (onTime, offTime, and ovelapFraction) attributes for each stream are computed (blocks 210, 212 and 214) from trace records after the beginnings and ends of ON/OFF phases are identified. For example, trace records corresponding to the first stream 54 could be processed to determine the workload phasing attributes.

The onTime attribute is computed to indicate a duration of I/O burst activity (block 210), while the offtime attribute is computed to indicate a duration of the non activity period (block 212). The onTime attribute may be computed as the mean value of the length of all ON phases 58 in the first stream 54. The offTime attribute may be computed as the mean value of the length of all OFF phases 60 in the first stream 54.

The requestRate attribute is computed to indicate an average request rate during bursty periods (block 214). The requestRate attribute may be computed as the total number of requests over the period equal to the sum of the length of ON intervals. The requestRate attribute, the onTime attribute and the offtime attribute may be reported separately for read and write request categories.

An overlapFraction attribute is computed to indicate the degree of simultaneous activity between two streams (e.g., the first and second streams 54 and 56) (block 216). The overlapFraction attribute is computed by measuring the overlap between ON phases for each pair of access streams. These phases of overlap 62 between two streams 54 and 56 are illustrated in FIG. 7. The overlapFraction attribute may be expressed as a percentage.

Using any or all of these attributes, data can later be re-allocated across the data storage system (block 218).

Reference is now made to Table 1 below, which shows a simple function in a pseudo-code for calculating the overlapFraction attribute for a first stream (s1) with respect to a second stream (s2). The parameter on_start (s,i) indicates the time stamp when the $i^{th}$ pulse (ON phase) in stream s comes on. The parameter on_end(s,i) indicates the time stamp when the $i^{th}$ pulse in stream s goes off. The parameter on_phase_no(s) indicates the number of ON phases for stream s in the total trace.

TABLE I

```
function overlapFraction (s1, s2)
{
    total = Σ(on_end(s1, i) - on_start(s1, i))
    if(total < 0.000001) return 0.0
    overlap_length = 0.0
    if (s1 = s2) return 1.0
    for (i=1; i<=on_phase no(s1); i++)
        for j=1; j<= on_phase_no(s2); j++)
        if( (on start(s2,j) < on_start (s1,i) & (on_start(s1,i) < on_end (s2,j))
            overlap_length += min (on_end(s1,i), on_end(S2,j)) -
            on_start(s1,i)
    return (overlap_length/total)
}
```

Thus, the overlapFraction (s1, s2) is computed as the expected length of time that the first stream s1 and the second stream s2 will be ON together immediately after the first stream s1 comes ON during an ON phase of the second stream s2, as a fraction of the length of time the first stream s1 stays ON. This may be zero, if the second stream s2 is never ON when the first stream s1 comes ON. It should be noted that the function shown in Table 1 is but one way of determining the overlap in I/O activity. Other ways of determining the overlap in I/O activity may be used instead.

Because of the enormous amount of data (the size of each trace might amount to several gigabytes), it should be a goal to identify the streams and generate the attributes in a computationally efficient manner. Such a computationally efficient manner is as follows. When a trace record is examined, record information is added to a running sum, and time stamps are examined, whereby the I/O activity in streams is identified by the time stamps, and statistics can later be generated from the running counts. This allows each trace record to be processed only once. After useful information has been extracted from the system trace, the system trace may be discarded (e.g., deleted from the separate storage device 30).

Figure 8:
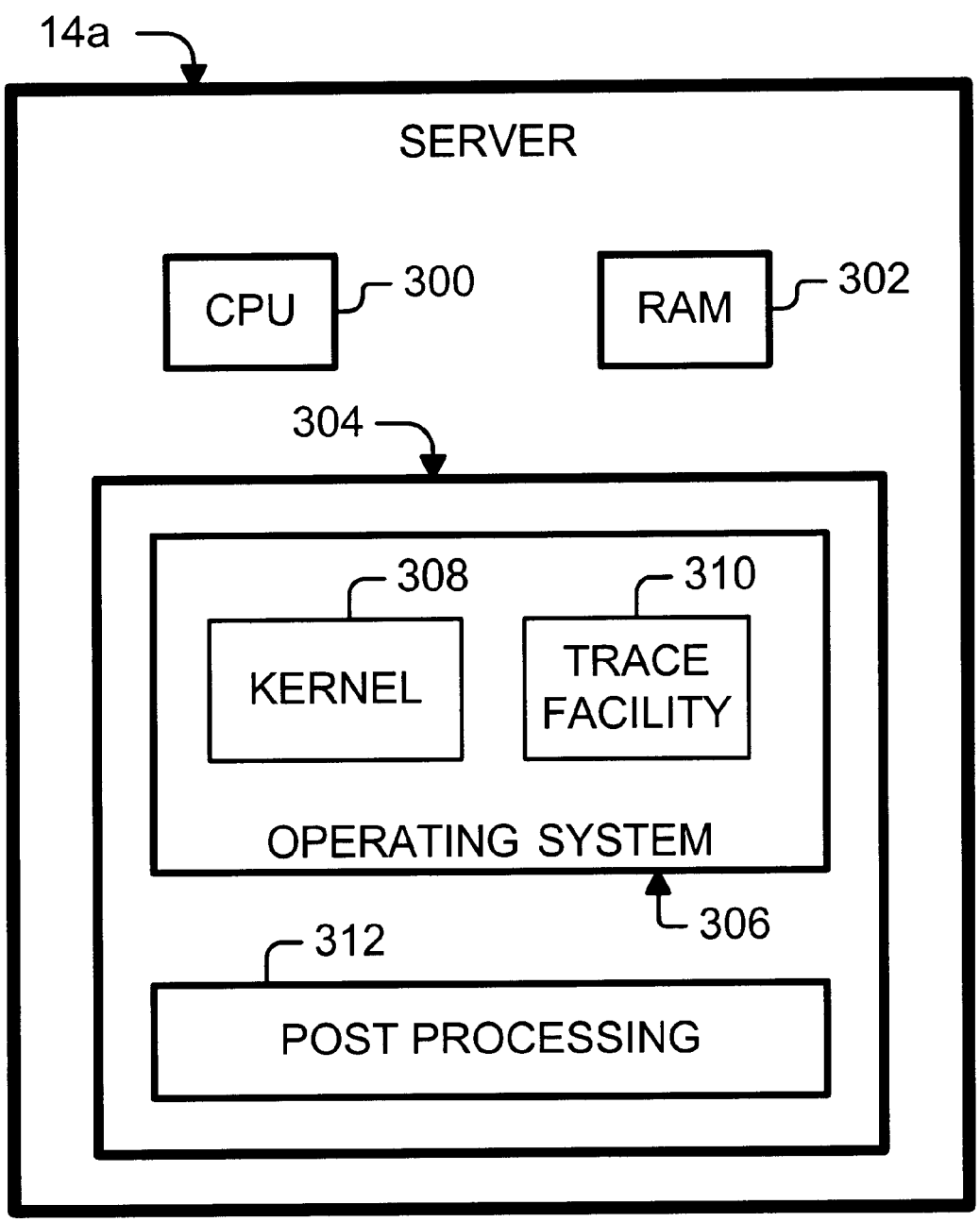
FIG. 8 is a block diagram of the server in the enterprise system.

Referring now to FIG. 8, a server 14 includes one or more central processing units 300, random access memory 302, and persistent (long term) memory 304 such as one or more hard drives. The persistent memory stores the "UNIX" operating system 306, which includes the "UNIX" kernel 308. The "UNIX" kernel is run in the background. The persistent memory 304 also stores the trace facility 310, which instructs at least one central processing unit 300 to gather the system traces; and store the system traces on the separate storage device 30. The server 14 may also store a post-processing program 312 which groups records in the system traces according to stores, identifies the streams, and processes the groups of records to generate attributes corresponding to the stores and streams. The operating system 310 and post-processing program 312 may be loaded into the long-term memory 304 via a peripheral device (e.g., a CD ROM drive) or via a network connection (e.g., a connection to the Internet). In the alternative, the operating system, including the trace facility, may be embedded in one or more read-only memory modules.

Figure 9:
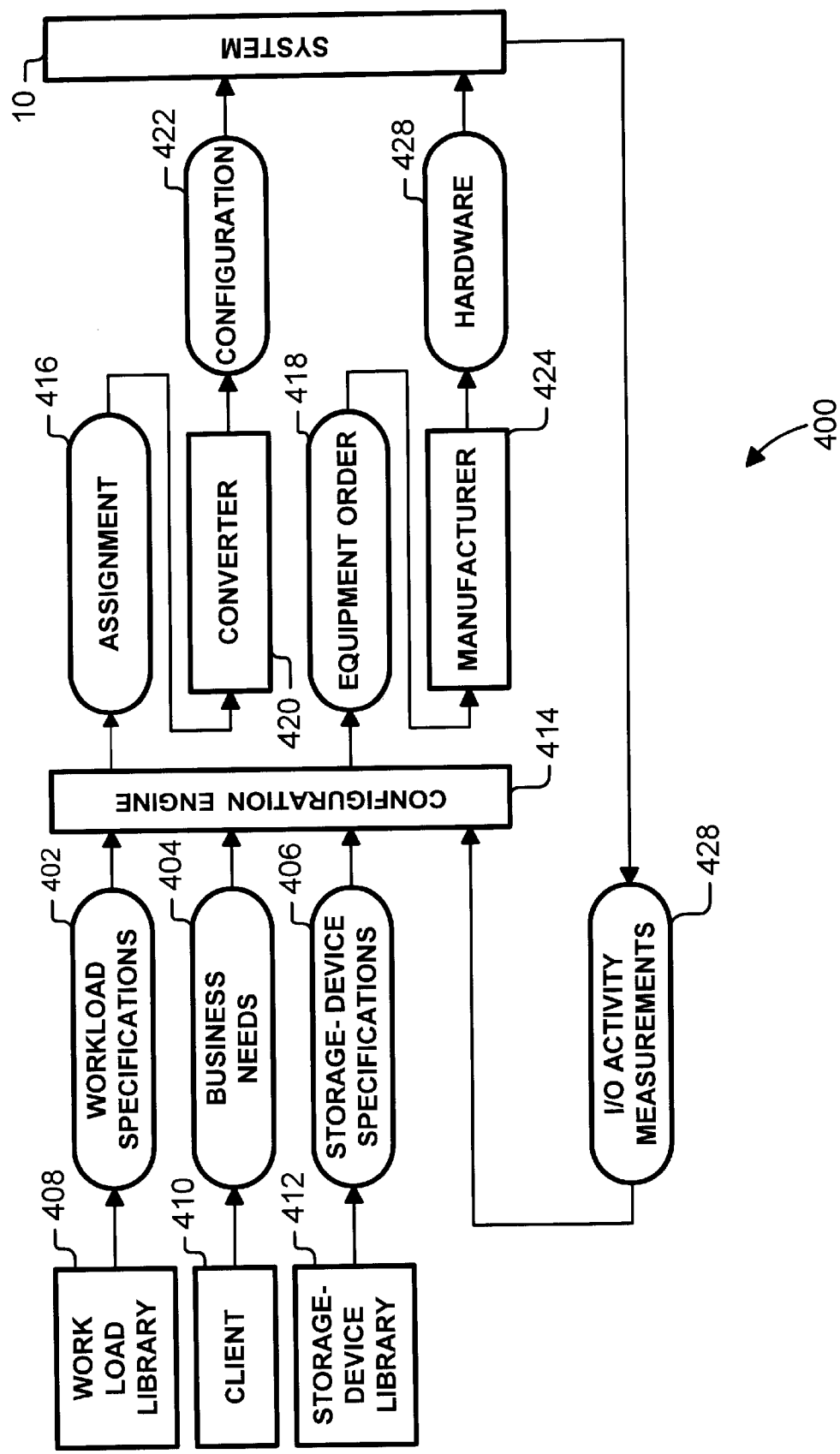
FIG. 9 is a block diagram of a system for configuring the enterprise system of FIG. 1.

FIG. 9 shows a procedure 400 for utilizing the workload characterizations to re-configure the enterprise system 10. Before discussing how the enterprise system 10 can be re-configured, it would be instructive to discuss how the enterprise system 10 was initially configured. During initial configuration, information such as workload specifications 402, business needs 404, and storage-device specifications 406 are provided to a configuration engine 414. This information may be stored in databases such as a workload library 408, a client database 410 and a storage device library 412. In response to this information, the configuration engine 414 generates an initial configuration for the enterprise system 10.

The workload specifications 402 may be determined by performing an informed assessment of the workload requirements for the enterprise system 10. Such an assessment might include predictions of current workload requirements and growth trends in workloads. A workload prediction might be based on loads generated by a predetermined number of users in existing computer systems. These predictions may be made by knowledgeable system designers.

The business needs 404 might include system attributes that are desired by a customer or client. Such attributes might include transaction rates, response times, relative performance requirements, growth expectations, cost-versus-performance emphasis, and availability goals. More specifically, an exemplary transaction rate desired by a client might be about 100 I/Os per second, and an exemplary response time desired by a client might be about 200 milliseconds.

The storage device specifications 406 might include information relating to the specification (e.g., capacity) and performance of available storage devices, including physical drives, optical drives, and tape drives.

The configuration engine 414 uses the information 402, 404, 406 stored in the databases 408, 410, 412 to explore possible configurations for the enterprise system 10. The configuration engine 414 might test each configuration to determine which one provides optimal performance. For example, the configuration engine 414 might measure system performance in terms of QoS guarantees for response time, capacity, speed, throughput, security or some other criteria.

A QoS guarantee for a system may be measured as a desired percentage of requests served in a desired period of time. For example, a client might want 95% of all requests from workstations to be served within a time frame of one second. Such a QoS guarantee might be based in part upon concurrency of I/O activity of different stores. Given a number of applications, the response time of each application is estimated given the concurrency of the other applications. Such a QoS guarantee is described in greater detail in Merchant et al. U.S. Ser. No. 09/172,114 filed on Oct. 13, 1998 and assigned to the assignee of the present invention.

Having determined an optimal configuration for the system 10, the configuration engine 414 generates an assignment 416 and an equipment order 418. The assignment 418 is a description of what needs to be done to configure the enterprise system 10. For example, the assignment 416 might contain information describing the allocation of data across the data storage devices of the data storage system 12. The assignment 416 might also contain information describing how the storage devices are to be configured. For example, the assignment 416 might describe redundancy levels for disk arrays, network connections and topologies, assignment of logical units to controllers, and so on.

The assignment 416 is inputted to a converter 420, which translates the information in the assignment 416 into a configuration 422. The converter 420 may accomplish this task by, for example, generating logical volume manager (LVM) scripts and DG Clariion (Nike) disk-array configuration commands.

The equipment order 418 is supplied to an equipment supplier or manufacturer 424 who provides hardware 426 necessary to build the system 10. The hardware 426 is then connected and configured according to the configuration 422 to produce the enterprise system 10.

Once built and running, the enterprise system 10 may be monitored for behavior and performance, thereby resulting in the generation of I/O activity measurements 428. The I/O activity measurements may be made by any host (e.g., a server or workstation) having access to the system traces in the enterprise system 10. Among the measurements 428 are the I/O activity attributes for the stores and streams. These actual measurements of attributes would replace certain initial estimates used by the configuration engine. For example, once the enterprise system 10 is built, concurrency of I/O activity can be measured for each store and stream. Thus, the measurements could replace the estimations. This would allow the configuration engine 414 to select a new optimal configuration based on the actual measurements rather than the estimations. The enterprise system 10 would then be modified according to the new configuration.

The measurements 428 also allow changes in the workloads and device configurations (e.g., changes caused by long-term device failure) to be identified and subsequently corrected. The configuration engine 414 may incrementally modify the assignment 416 to the point at which more equipment is needed for the enterprise system 10 to operate with the desired attributes. Thus, measuring the attributes enables the configuration engine 414 to modify the configuration in response to subsequent changes in workloads, hardware, etc.

Thus disclosed is an invention that characterizes I/O activity of streams in a data storage system. The I/O activity characterization may be used to allocate data more efficiently across the data storage system. Additionally, the data storage system does not have to be over-provisioned to meet certain QoS guarantees. Consequently, a fewer number of data storage devices may be used in the data storage system.

The invention makes use of existing operating system tools. This minimizes the overhead and cost of characterizing the I/O activity. Moreover, the invention characterizes the I/O activity in a computationally efficient manner.

The invention provides a compact description of the application behavior that can be used for analytical modeling of the storage system performance or for generating synthetic workloads.

The invention is not limited to the specific embodiments described and illustrated above. The attributes may be extended to handle multiple streams of requests accessing the same store. This would require a different definition of a stream, for example, as all requests initiated by a particular process.

Selective sampling, where only a portion of the total trace is examined, can be performed. This would reduce the overhead of the trace record processing.

Hosts other than a server can be used to group the trace records, identify the streams and generate the attributes. This can be done off-line or on-line, while the system is running. On-line I/O activity characterization would allow for monitoring and notification for certain levels of performance or access patterns within the data storage system.

Accordingly, the invention is not limited to the specific embodiments described and illustrated above. Instead, the invention is construed according to the claims that follow.

What is claimed is:

1. A method of characterizing I/O activity in a data storage system, a computer generating system traces during I/O operations with the data storage system, the method comprising:

having the computer to gather the system traces;

grouping records in the gathered system traces, the records being grouped according to stores, the stores representing units of storage in the data storage system;

identifying I/O activity in streams corresponding to the stores; and processing the groups of records to characterize I/O activity for the streams.

2. The method of claim 1, further comprising re-allocating data across the data storage system, the re-allocation being based on the I/O activity characterization.

3. The method of claim 1, wherein the traces that have been gathered are stored on a separate data storage device.

4. The method of claim 1, wherein the processing includes generating attributes for the streams, the attributes being statistics of I/O activity distribution.

5. The method of claim 1, wherein the I/O activity of a given stream is identified by examining timestamps in the trace records corresponding to the given stream, the time stamps indicating on and off phases of the given stream.

6. The method of claim 5, wherein the beginning of a phase in the stream is marked by a time stamp following a given period of inactivity, and wherein the end of the phase is marked by the last time stamp prior to a next period of I/O inactivity.

7. The method of claim 1, wherein the processing includes generating phasing attributes for each stream.

8. The method of claim 7, wherein the phasing attributes include a first attribute indicating simultaneous activity between first and second streams, the first attribute representing a length of time that the first and second streams are on together immediately after the first stream comes on, as a fraction of the length of time the first stream stays on.

9. The method of claim 1, wherein the processing includes adding record information to a running sum and examining time stamps as each record is processed, beginnings and endings of ON phases of a stream being identified by the time stamps, whereby statistics can be generated from the running counts and records can be processed only once.

10. A method of determining an overlap of I/O activity between first and second streams in a data storage system, the method comprising:

process system traces to identify I/O activity in each stream; and determining a length of time that the first and second streams are on together immediately after the first stream comes on, as a fraction of the length of time the first stream stays on, whereby the fraction provides a measure of the overlap.

11. A system comprising a data storage system;

first means for conducting I/O operations with the data storage devices, system traces being generated during the I/O operations;

second means for gathering the system traces;

third means for grouping records in the gathered system traces, the records being grouped according to stores, the stores being units of within the data storage system;

fourth means for identifying I/O activity in streams corresponding to the stores; and fifth means for processing the groups of records to characterize I/O activity for the streams.

12. The system of claim 11, further comprising a separate data storage device for storing the traces that are gathered.

13. The system of claim 11, further comprising means for re-allocating data across the data storage system, the re-allocation being based on the I/O activity characterization.

14. A computer having access to system traces from a data storage system, the computer comprising at least one processor; and computer memory; the memory being encoded with a plurality of executable instruction, the instructions, when executed, instructing the computer to:

group records in the system traces, the records being grouped according to stores, the stores being units of storage in the data storage system;

identify I/O activity in streams corresponding to the stores; and process the groups of records to characterize I/O activity for the streams.

15. The computer of claim 14, wherein the I/O activity of a given stream is identified by examining timestamps in the records of a store corresponding to the given stream, the time stamps indicating on and off phases of the given stream.

16. The computer of claim 15, wherein the beginning of a phase in the given stream is marked by a time stamp following a given period of inactivity, and wherein the end of the phase is marked by the last time stamp prior to a next period of I/O inactivity.

17. The computer of claim 14, wherein the processing includes generating phasing attributes for each stream.

18. The computer of claim 17, wherein the phasing attributes include a first attribute indicating simultaneous activity between first and second streams, the first attribute representing a length of time that the first and second streams are on together immediately after the first stream comes on, as a fraction of the length of time the first stream stays on.

19. The computer of claim 14, wherein the processing includes adding record information to a running sum and examining time stamps as each record is processed, beginnings and endings of ON phases of a stream being identified by the time stamps, whereby statistics can be generated from the running counts and records can be processed only once.

20. An article of manufacture for a computer having access to a multitude of system traces from a data storage system, the article comprising:

computer memory; and a plurality of executable instructions encoded in the memory, the instructions, when executed, instructing the computer to group records in the system traces, the records being grouped according to stores, the stores being units of storage in the data storage system; identify I/O activity in streams corresponding to the stores; and process the groups of records to characterize I/O activity for the streams.

21. The article of claim 20, wherein the I/O activity of a given stream is identified by examining timestamps in the records of a store corresponding to the given stream, the time stamps indicating on and off phases of the given stream.

22. The article of claim 21, wherein the beginning of a phase in the given stream is marked by a time stamp following a given period of inactivity, and wherein the end of the phase is marked by the last time stamp prior to a next period of I/O inactivity.

23. The article of claim 20, wherein the processing includes generating phasing attributes for each stream.

24. The article of claim 23, wherein the phasing attributes include a first attribute indicating simultaneous activity between first and second streams, the first attribute representing a length of time that the first and second streams are on together immediately after the first stream comes on, as a fraction of the length of time the first stream stays on.

25. The article of claim 20, wherein the processing includes adding record information to a running sum and examining time stamps as each record is processed, beginnings and endings of ON phases of a stream being identified by the time stamps, whereby statistics can be generated from the running counts and records can be processed only once.

* * * * *